(12) United States Patent
Tsuchiya et al.

(10) Patent No.: US 11,951,671 B2
(45) Date of Patent: Apr. 9, 2024

(54) PREFORM TEMPERATURE ADJUSTMENT DEVICE AND TEMPERATURE ADJUSTMENT METHOD

(71) Applicant: NISSEI ASB MACHINE CO., LTD., Nagano (JP)

(72) Inventors: Tomoaki Tsuchiya, Nagano (JP); Takeshi Hidai, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 195 days.

(21) Appl. No.: 17/602,377

(22) PCT Filed: Apr. 9, 2020

(86) PCT No.: PCT/JP2020/015950
§ 371 (c)(1),
(2) Date: Oct. 8, 2021

(87) PCT Pub. No.: WO2020/209328
PCT Pub. Date: Oct. 15, 2020

(65) Prior Publication Data
US 2022/0161482 A1    May 26, 2022

(30) Foreign Application Priority Data
Apr. 9, 2019   (JP) ................. 2019-073875

(51) Int. Cl.
*B29C 49/78*    (2006.01)
*B29C 49/06*    (2006.01)
(Continued)

(52) U.S. Cl.
CPC .......... *B29C 49/786* (2013.01); *B29C 49/06* (2013.01); *B29C 49/6436* (2013.01); *B29C 49/78* (2013.01); *B29L 2031/7158* (2013.01)

(58) Field of Classification Search
CPC ......... B29B 11/08; B29B 13/02; B29B 13/04; B29C 49/786; B29C 49/6436;
(Continued)

(56) References Cited

U.S. PATENT DOCUMENTS

| | | | |
|---|---|---|---|
| 2006/0118983 A1 | 6/2006 | Cochran et al. | |
| 2015/0117489 A1* | 4/2015 | McGurk | G01J 5/0808 374/121 |
| 2016/0368197 A1 | 12/2016 | Takahashi et al. | |

FOREIGN PATENT DOCUMENTS

| | | |
|---|---|---|
| CN | 1010-84095 A | 12/2007 |
| JP | 4-12212 A | 1/1992 |

(Continued)

OTHER PUBLICATIONS

International Search Report issued in International Patent Application No. PCT/JP2020/015950, dated Jun. 23, 2020, along with an English translation thereof.

(Continued)

*Primary Examiner* — Monica A Huson
(74) *Attorney, Agent, or Firm* — GREENBLUM & BERNSTEIN, P.L.C.

(57) ABSTRACT

In a blow-molding apparatus, a cooling device and a heating device are each driven by being supplied with electricity of a predetermined voltage from a supply power source. The blow-molding apparatus comprises: a monitoring device configured to constantly monitor fluctuation of the predetermined voltage; and an output automatic control mechanism configured to, in a case where the predetermined voltage monitored by the monitoring device fluctuates beyond a normal range, automatically fluctuate an output of at least one of the heating device and the cooling device to keep the output in a certain range, thereby adjusting at least one of the preform temperature and the ambient temperature to fall within a normal temperature range.

5 Claims, 9 Drawing Sheets

(51) Int. Cl.
*B29C 49/64* (2006.01)
*B29L 31/00* (2006.01)

(58) Field of Classification Search
CPC ......... B29C 49/68; B29C 45/00; B29C 49/06; B29C 49/6418; B29C 2049/7882; B29C 2949/0771; B29C 49/6427; B29C 49/6845; B29C 2049/7861; B29C 2049/023; B29C 49/78; B29C 2949/0715; B29L 2031/7158; B29L 2031/716
See application file for complete search history.

(56) References Cited

FOREIGN PATENT DOCUMENTS

| | | |
|---|---|---|
| JP | 2000-508593 A | 7/2000 |
| JP | 2008-521662 A | 6/2008 |
| JP | 2012-245753 A | 12/2012 |
| JP | 2019-1111 A | 1/2019 |
| WO | 1997/39874 A1 | 10/1997 |
| WO | 2006/060690 A2 | 6/2006 |
| WO | 2014/208693 A | 12/2014 |

OTHER PUBLICATIONS

Written Opinion of the International Searching Authority issued in International Patent Application No. PCT/JP2020/015950, dated Jun. 23, 2020, along with an English translation thereof.
Office Action dated Apr. 29, 2023 in Chinese family member application No. 202080039303.8. Note: This document is being submitted for its characterization of the citations therein as category "X", "Y", "A", etc., and the Examiner's consideration of this information on that basis is respectfully requested.

* cited by examiner

PREFORM TEMPERATURE ADJUSTMENT DEVICE AND TEMPERATURE ADJUSTMENT METHOD

BACKGROUND OF THE INVENTION

Field of the Invention

The present invention relates to a blow-molding apparatus and a blow-molding method in a hot parison type. Specifically, the present invention relates to a blow-molding apparatus and a blow-molding method capable of achieving temperature adjustment of a preform by automatically changing output of at least one of a heating device which heats the preform and a cooling device which cools the preform according to voltage fluctuation of a supply power source.

Description of the Related Art

Conventionally, as an injection stretch blow-molding machine, there is known a blow-molding apparatus which includes a cooling unit which, after performing injection molding of a plurality of preforms in a batch manner (for example, eight preforms×three rows=a batch of 24 preforms), temporarily cools the preforms, a temperature adjustment unit which performs temperature adjustment of temperature equalization by switching the batch manner to a continuous manner, conveying the preforms, heating the preforms by a heating device, and preventing overheating by the cooling device, and a blow-molding unit that performs blow molding of the temperature-adjusted preforms (details will be described later in FIG. 1).

Herein, in the hot parison type blow-molding method, a molding method capable of satisfactorily manufacturing a transparent preform and a container even when an injection molding time (particularly, a cooling time) is remarkably shortened has been developed, and thus, also in the injection stretch blow-molding machine described above, it has become possible to manufacture a high-quality container in a shorter molding cycle time (in a high cycle) than before.

However, when the blow-molding machine is operated under a high cycle, it is more difficult to continuously mold and manufacture the container at a constant quality than before. That is, in order to enhance the stability of molding and manufacturing, it is necessary to control the blow-molding machine more accurately and precisely, and in particular, it is required to further improve a method of controlling the temperature adjustment unit of the preform.

As an example, the heating device of a heating unit is provided on the preform conveyance line, and heats the preform passing through the device by, for example, an infrared heater.

However, when the atmosphere in the heating device rises excessively or gradually, the temperature distribution of the preform becomes uneven. Thus, a configuration is provided in which cooling air is blown from a blower which is the cooling device to the preform to cool the preform, and air in the heating device is released to the outside to suppress a rise in temperature in the heating device.

For example, a configuration is provided in which a preform is cooled by cooling air blown out into a heating furnace from a blowout port, and a wire mesh for adjusting the temperature in the heating furnace by releasing the air of the heating furnace to the outside of the furnace is provided on a top surface (upper portion) of the heating furnace (see JP 2012-245753 A). Further, for example, a configuration is provided in which when the inside of the tunnel in which a preform is conveyed is decompressed by a blower, cooling air is drawn into a tunnel, and air heated in the tunnel is discharged (see JP 04-12212 B).

An infrared heater and a blower may be provided in the casing of the heating device to heat the preform by the infrared heater and to suppress an excessive rise in the ambient temperature of the heating device by the cooling air from the blower. (see WO 2014/208693)

However, in the conventional heating device, when the voltage of the supply power source for the infrared heater and the blower greatly fluctuates, the output of the infrared heater and the blower also tends to greatly fluctuate following the fluctuation. For example, when the output of the infrared heater decreases so that heating is insufficient, the preform is brought into a low temperature state, and the temperature distribution becomes non-uniform. Then, when the preform (preform with high stretch ratio, especially for thin and lightweight containers) is blow-molded, the preform is easily ruptured. In addition, water droplets (moisture) in the vicinity of dew condensation on the surface of the molding device or the blow mold are scattered and attached to the subsequent preform by the blow air at the time of the rupture of the preform, so that the temperature of the preform is further lowered, and the subsequent preform is easily ruptured at the time of blow-molding. That is, the conventional heating device (blow-molding apparatus) has a problem that molding defects such as a rupture are likely to occur continuously due to voltage fluctuation.

When the temperature distribution in the heating device becomes non-uniform, the temperature distribution between individual preforms becomes non-uniform, and even when the preform is continuously blow-molded in the subsequent blow-molding process, a container with a certain quality cannot be obtained. In particular, in a case where a thin and lightweight container is obtained by blow-molding under a high cycle, a defect rate increases due to a minute temperature difference of each preform.

SUMMARY OF THE INVENTION

A blow-molding apparatus according to one embodiment of the present invention comprises a preform temperature adjustment apparatus which performs temperature adjustment by performing temperature processing by a heating device configured to heat an injection-molded preform to increase a preform temperature or an ambient temperature thereof and a cooling device configured to cool the preform or an atmosphere thereof to reduce the preform temperature or the ambient temperature thereof, and the preform subjected to the temperature adjustment is sent to a blow-molding device. The cooling device and the heating device are each driven by being supplied with electricity of a predetermined voltage from a supply power source. The blow-molding apparatus further comprises: a monitoring device configured to constantly monitor fluctuation of the predetermined voltage; and an output automatic control mechanism configured to, in a case where the predetermined voltage monitored by the monitoring device fluctuates beyond a normal range, automatically fluctuate an output of at least one of the heating device and the cooling device to keep the output in a certain range, thereby adjusting at least one of the preform temperature and the ambient temperature to fall within a normal temperature range.

A blow-molding apparatus according to other embodiment of the present invention comprises a preform temperature adjustment apparatus which performs temperature adjustment by performing temperature processing on an injection-molded preform by a heating device configured to heat the preform to increase a preform temperature and a cooling device configured to cool the preform to reduce the preform temperature, and the preform subjected to the temperature adjustment is sent to a blow-molding device. The cooling device and the heating device are each driven by being supplied with electricity of a predetermined voltage from a supply power source. The blow-molding apparatus further comprises: a monitoring device configured to constantly monitor at least one of fluctuation in the predetermined voltage, the preform temperature, and an ambient temperature; and an output automatic control mechanism configured to, in a case where the predetermined voltage monitored by the monitoring device fluctuates beyond a normal range or a case where an abnormality occurs in blow-molding of the preform due to fluctuation in at least one value of the preform temperature and the ambient temperature, automatically fluctuate an output of at least one of the cooling device and the heating device to keep the output in a certain range, thereby adjusting at least one of the preform temperature and the ambient temperature to fall within a normal temperature range.

One embodiment of the present invention provides a blow-molding method which performs temperature adjustment by performing temperature processing on an injection-molded preform by a heating device configured to heat the preform and a cooling device configured to cool the preform, and sends the preform subjected to the temperature adjustment to a blow-molding process. The method includes: performing the temperature adjustment of the preform or an atmosphere thereof by supplying the cooling device and the heating device with drive electricity of a predetermined voltage from a supply power source; constantly monitoring the predetermined voltage from the supply power source; and automatically fluctuating an output of at least one of the cooling device and the heating device to keep the output in a certain range and adjusting at least one of the preform temperature and the ambient temperature to fall within a normal temperature range in a case where the predetermined voltage monitored fluctuates beyond a normal range.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings.

Figure 1:
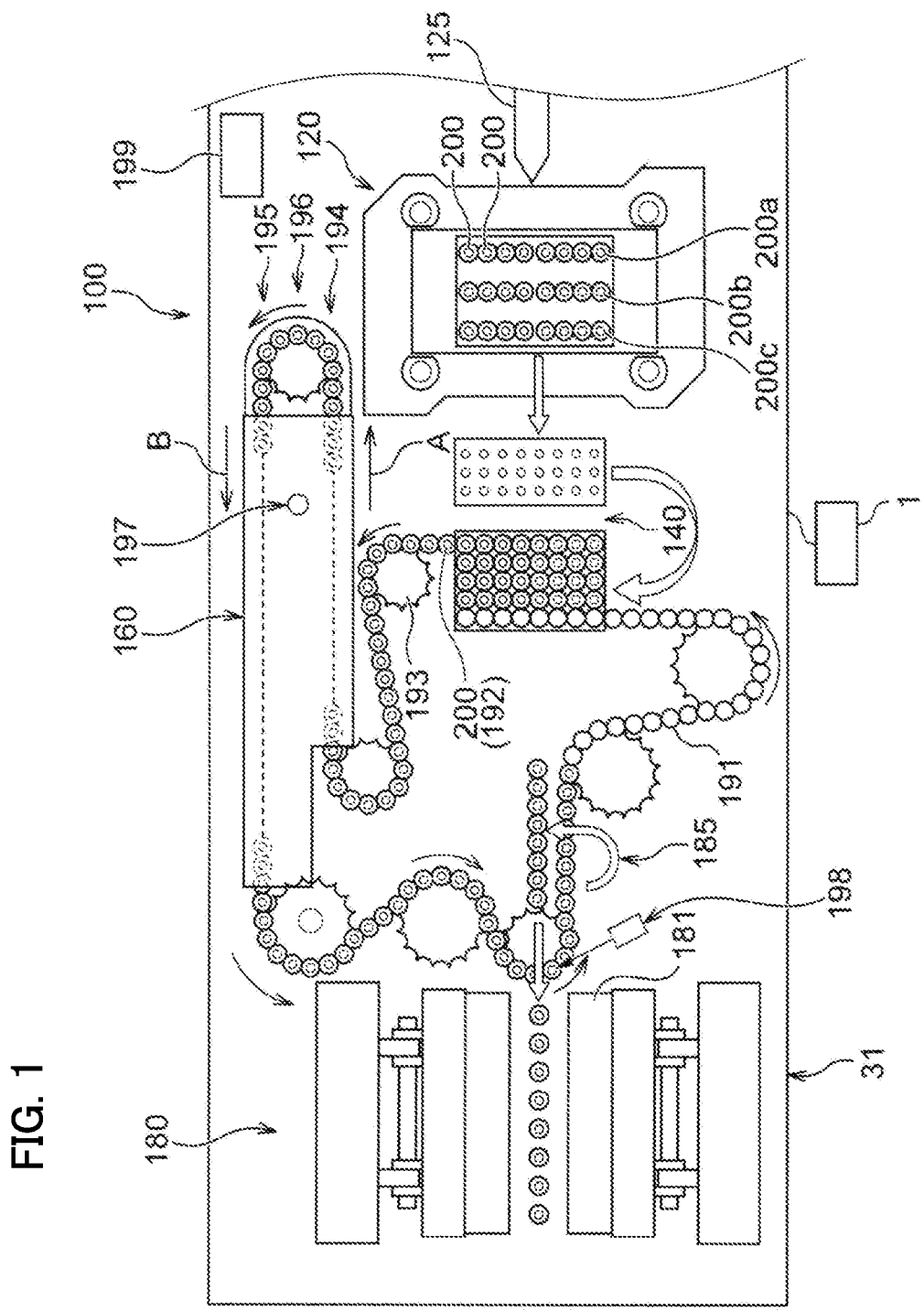
FIG. 1 is a plan view of a blow-molding apparatus to which an example of a preform temperature adjustment apparatus according to an embodiment of the present invention is applied.
Figure 2:
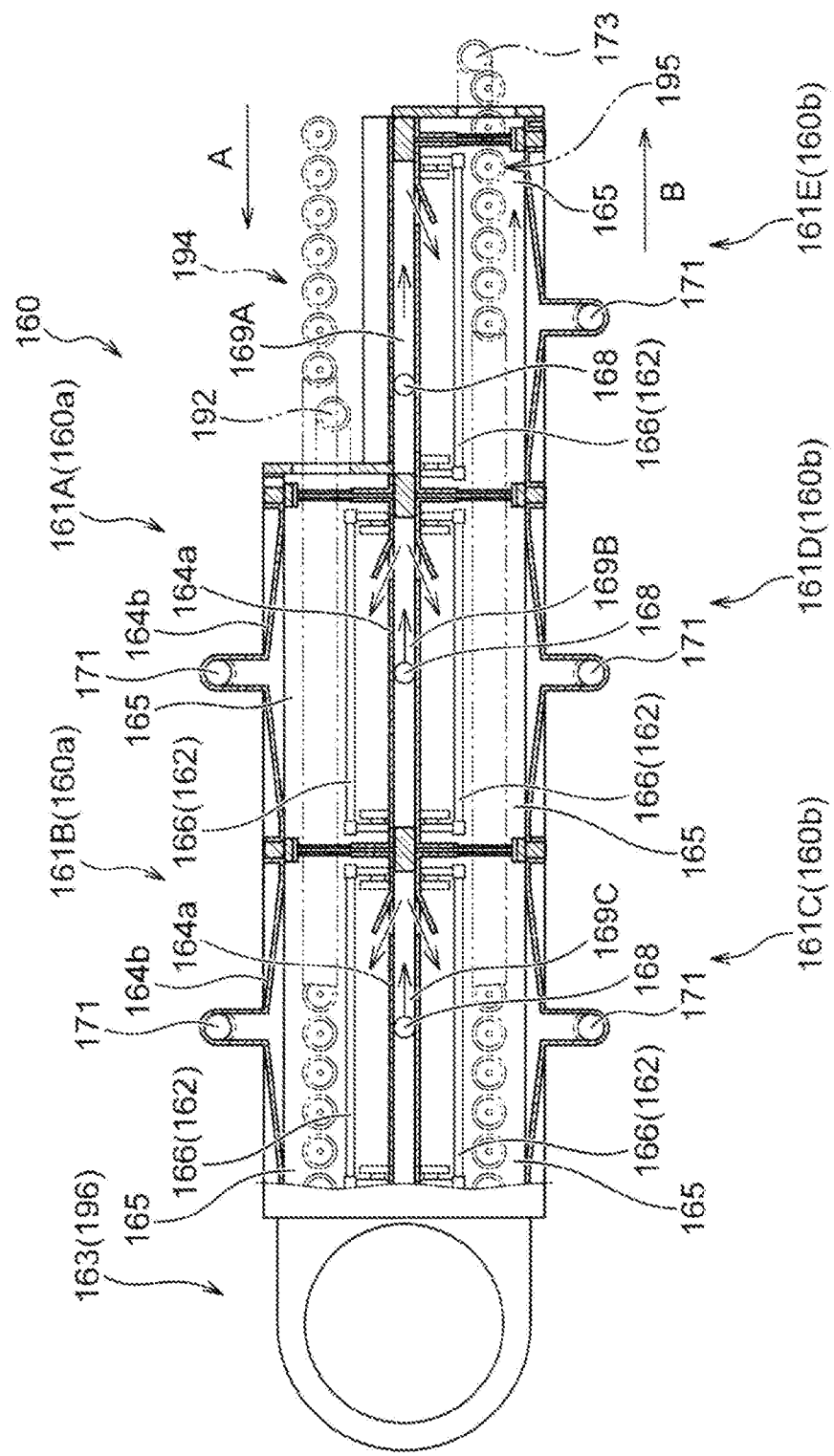
FIG. 2 is a plan cross-sectional view of a heating device of the blow-molding apparatus.
Figure 3:
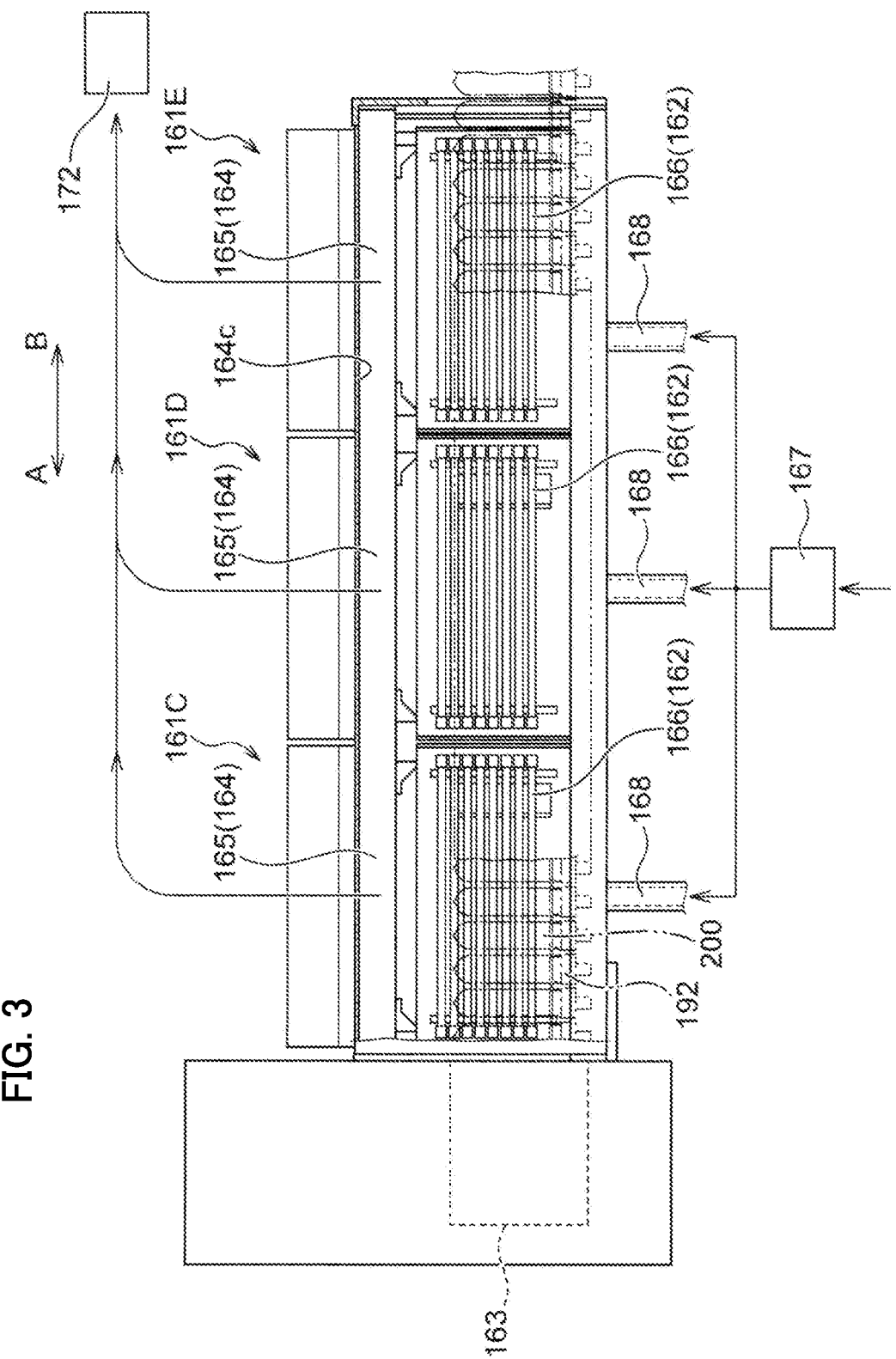
FIG. 3 is a side cross-sectional view of the heating device of the blow-molding apparatus.
Figure 4:
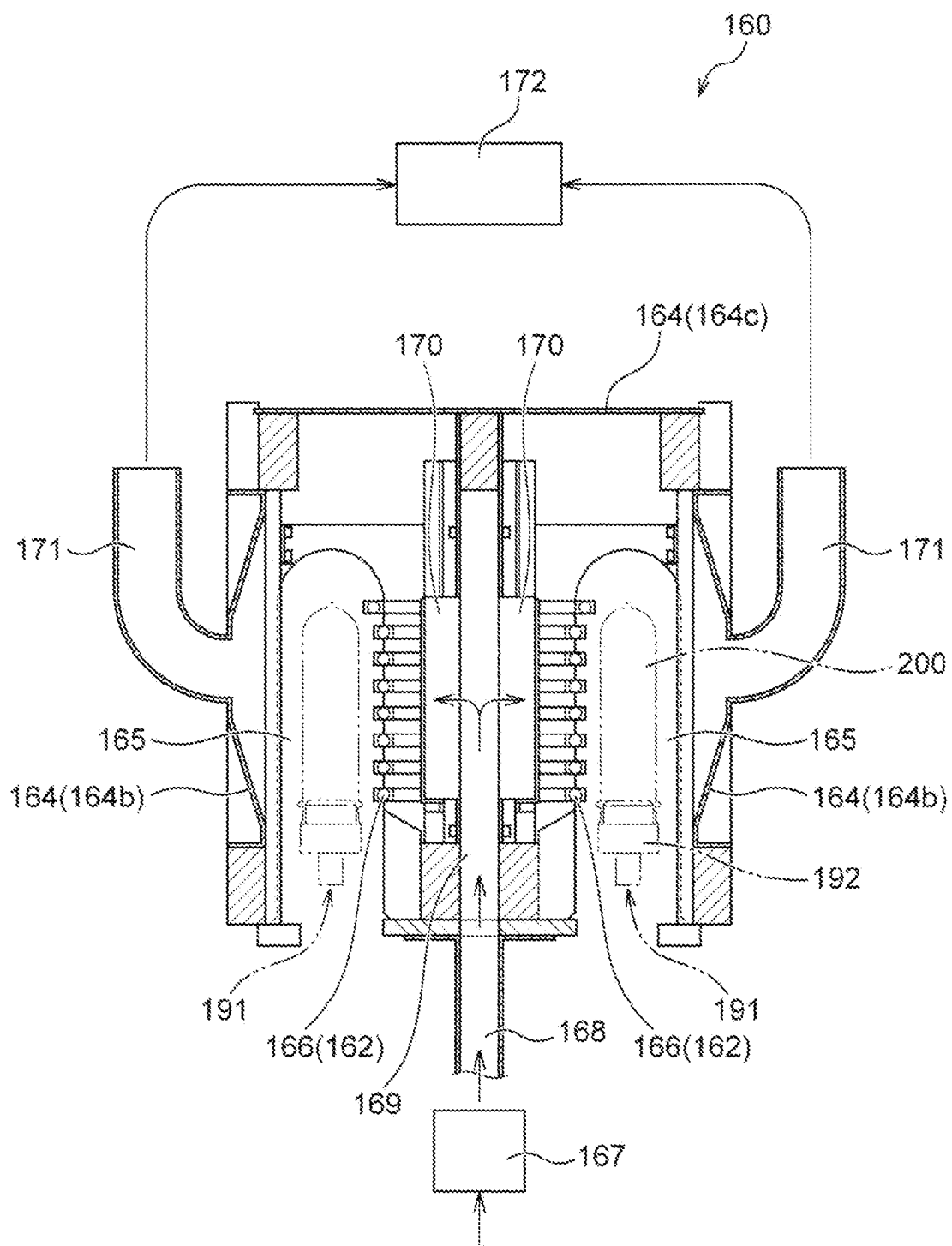
FIG. 4 is a front cross-sectional view of the heating device of the blow-molding apparatus.

FIG. 1 is a plan view of a blow-molding apparatus to which an example of a preform temperature adjustment apparatus according to an embodiment of the present invention is applied, and FIGS. 2 to 4 are a plan cross-sectional view, a side cross-sectional view, and a front cross-sectional view of a heating device of the blow-molding apparatus, respectively.

Figure 5:
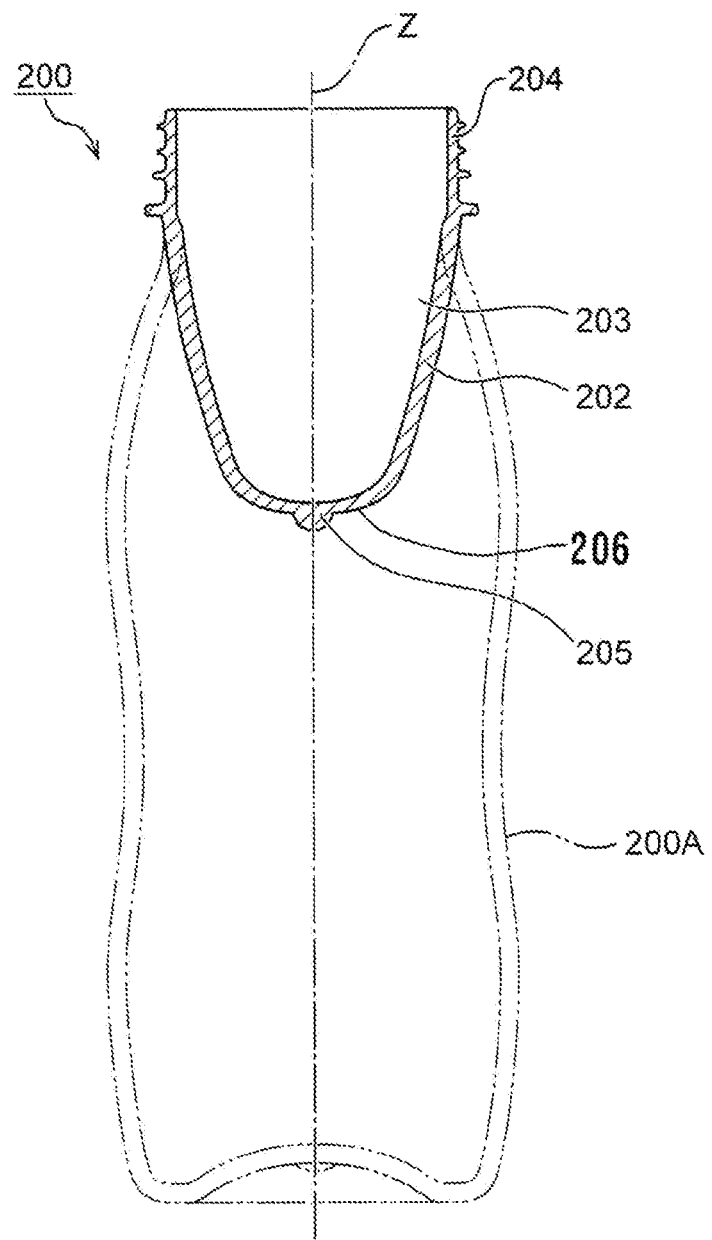
FIG. 5 is a cross-sectional view illustrating a preform molded by the blow-molding apparatus and a completed container.

As illustrated in FIG. 1, a blow-molding apparatus 100 according to this embodiment includes an injection molding unit 120 which simultaneously injection-molds a plurality of (for example, 24 (in FIG. 1, three rows 200a, 200b, and 200c each include eight preforms 200)) preforms 200, a cooling unit 140 which cools the preform 200 molded by the injection molding unit 120, a heating unit (a temperature adjustment unit, a heating device) 160 which heats the preform 200, and a blow-molding unit 180 which blow-molds the preform 200 to obtain a container, which are provided on a machine base 31. Incidentally, as illustrated in FIG. 5, in detail, each preform 200 has a bottomed cup shape having an axis Z, and includes a wall portion (body portion) 202, a storage portion 203 in the wall portion 202, a neck portion 204, a gate portion 205, and a bottom portion 206. In the blow-molding unit 180, air is blown into the storage portion 203, and the storage portion is expanded to form a container 200A of a PET bottle or the like.

The blow-molding apparatus 100 includes a loop-shaped conveyance line 191 which circulates from the cooling unit 140 to the heating device 160 and the blow-molding unit 180 by being driven by a plurality of sprockets 193. The preform 200 is conveyed from the cooling unit 140 to the heating device 160 by the conveyance line 191, and the preform 200 heated by the heating device 160 is conveyed to the blow-molding unit 180.

The present invention is characterized by the configuration of the heating device 160 included in the blow-molding apparatus 100. As a part of the configuration of the heating device 160, a voltage detector 199 which detect a voltage fluctuation of the supply power source and a control panel (monitoring device) 1 are also provided in the blow-molding apparatus 100. Incidentally, other configurations of the injection molding unit 120, the cooling unit 140, the blow-molding unit 180, and the like are known, and thus, will be briefly described here.

The injection molding unit 120 can simultaneously mold the first batch number of, for example, 24 (three rows 200a to 200c×8) preforms 200 by an injection device 125 (see FIG. 1) as described above. Incidentally, the number is not limited to 24, and may be 36 (three rows×12) or another batch number, or may be the number of rows other than three rows.

The cooling unit 140 forcibly cools the first batch number of the injection-molded preforms 200.

Incidentally, the preform 200 is molded and conveyed in an upright state with the neck portion facing upward in the injection molding unit 120, but is reversed to an inverted state with the neck portion facing downward in the cooling unit 140, and is held by a conveyance jig 192 included in a conveyance unit 190 in this state.

In the conveyance line 191, a plurality of conveyance jigs 192 sequentially and continuously feed the preforms 200 while holding the preforms, so that the preforms 200 are conveyed along the conveyance line 191 and carried into the heating device 160.

The heating device 160 heats the preform 200 to a temperature suitable for stretching while conveying the preform along the conveyance line 191. Incidentally, the preform 200 is conveyed while rotating on the conveyance line 191, and thus the preform can be heated to a substantially uniform temperature over the entire circumference of the preform.

Here, the portion of the conveyance line 191 where the heating device 160 is provided includes a first straight portion 194 which linearly conveys the conveyance jig 192 in a direction of an arrow A in FIG. 1, a second straight portion 195 which is positioned in the same horizontal plane as the first straight portion 194 and linearly conveys the conveyance jig 192 in a direction of an arrow B opposite to the direction of the arrow A, and a curved portion 196 which is formed in a substantially arc shape and connects both the straight portions 194 and 195.

In the blow-molding unit 180, as illustrated in FIG. 1, the preforms 200 are blow-molded by the second batch number, for example, 8 in each set to obtain the container 200A. The second batch number is preferably set in a range of ½ to ¼ of the first batch number, and particularly preferably set to ⅓.

Next, details of the heating device 160 will be described. As illustrated in FIG. 2, in the heating device 160, a plurality of (for example, five) heating boxes 161 (161A to 161E) in which heating units 162 are accommodated are arranged in two rows. Specifically, the first and second heating boxes 161A and 161B are arranged side by side along the first straight portion 194 to configure a first heating device 160a, and the third to fifth heating boxes 161C to 161E are arranged side by side along the second straight portion 195 to configure a second heating device 160b. Further, the heating device 160 includes an exhaust portion 163 at a position corresponding to the curved portion 196, and the second heating box 161B of the first heating device 160a and the third heating box 161C of the second heating device 160b are connected via the exhaust portion 163.

As illustrated in FIG. 4, a reference numeral 164 denotes a cover member, and the cover member extends in each of the heating boxes 161 (161A to 161E) to cover three sides of both side surfaces and an upper surface of the conveyance line 191 to define a conveyance space 165 in which the preform 200 is conveyed. The heating unit 162 is installed between two rows of the conveyance preforms 200 in the conveyance space 165 of the cover member 164. Further, the cover member 164 is provided with a discharge pipe 171 for discharging an atmosphere (air) in the heating device 160 to the outside.

Each heating unit 162 includes a heater (an infrared heater, a heater) 166 extending along the conveyance direction of the preform 200 and arranged in a plurality of (for example, eight) stages in a vertical direction (see FIG. 3). Further, an atmosphere (air) heated to a predetermined temperature by the heater 166 exists in the conveyance space 165 in each heating box 161.

Then, each preform 200 is sequentially conveyed in the conveyance space 165 while rotating in the heating device 160, so that the preform is heated to the temperature suitable for stretching by a plurality of heating units 162 (heaters 166) and the atmosphere (air) in the conveyance space 165 of the heating box 161, and an appropriate temperature distribution is imparted in the axial direction thereof.

In FIGS. 3 and 4, reference numerals 167 and 172 denote first and second blowers (blower, cooling device, cooling blower), and the first and second blowers are provided continuously with the heating device 160. The first blower 167 supplies cooling air to a conveyance space 165 of each heating box 161 via a supply pipe 168 and an air blowing space 169 (particularly see FIG. 4) to cool the preform 200 and the infrared heater 166. The second blower 172 is connected to the discharge pipe 171, and discharges the atmosphere (air) in the heating unit 162 and the heated cooling air (hot air) to the outside to suppress the temperature rise in the heating box 161, similarly to the exhaust portion 163 (see FIGS. 2 and 3).

In the configuration of this embodiment, as illustrated in FIG. 4, the cooling air supplied to the air blowing space 169 passes from the inner surface side of the heating unit 162 to the outside through a gap between the heaters 166 of the heating unit 162 and reaches the surface of the preform 200 in the conveyance space 165. That is, in the heating device 160 according to this embodiment, when the preform 200 is heated to the temperature suitable for stretching, the preform 200 is cooled by the cooling air, and the surfaces of the heaters are also cooled together.

The cooling air (hot air) heated by cooling the preform 200 and the like is combined with the atmosphere (air) in the heating box 161, and then discharged from the discharge pipe 171 to the outside by the second blower 172. Accordingly, an excessive temperature rise of the atmosphere (air) in the heating box 161 is suppressed, and a predetermined temperature is maintained.

Incidentally, there is a characteristic that the temperature rise change of the atmosphere based on the heating by the heater 166 can be performed in a relatively short period of time, but the temperature drop change of the atmosphere based on the cooling by the first and second blowers 167 and 172 takes a relatively long period of time.

Here, in the heater 166 and the first and second blowers 167 and 172 for cooling of the heating device 160, when the supply voltage from the supply power source of the factory greatly fluctuates, the outputs of the heater 166 and the cooling blowers 167 and 172 also greatly fluctuate. For example, when the supply voltage excessively fluctuates in a negative direction (the voltage excessively drops), the heating output of the heater 166 decreases, the flow rate outputs of the cooling blowers 167 and 172 also decrease, and the cooling capacity also decreases. Thus, the preform temperature decreases as compared with a case where there is no voltage fluctuation, and the preform cannot reach the temperature suitable for stretching. Therefore, the temperature distribution of the conveyed preform 200 becomes non-uniform (irregular) or not suitable for blow-molding, and blow-molding cannot be performed satisfactorily in the subsequent blow-molding process.

For example, when the preform temperature decreases, and the preform temperature distribution becomes non-uniform as described above, the preform is easily ruptured at the time of being blow-molded in the subsequent step. Further, there is a problem that water droplets (moisture) in the vicinity of dew condensation on the surface of the molding device or the blow mold are scattered and attached to the subsequent preform by the blow air at the time of the rupture of the preform, so that the temperature of the preform is further lowered, whereby molding defects such as a rupture are likely to occur continuously. The present invention solves this problem, and the configuration and operation thereof will be described below.

FIGS. 6 to 9 are control panel screens for explaining the configuration and operation of the present invention. In the following description, a "preform temperature" means the temperature, which is measured by a temperature sensor 198, of the preform immediately before blow-molding in FIG. 1, and an "ambient temperature (or heater zone temperature)" means the ambient temperature inside the heating device 160 measured by the temperature sensor 197 in FIG. 1.

Figure 6:
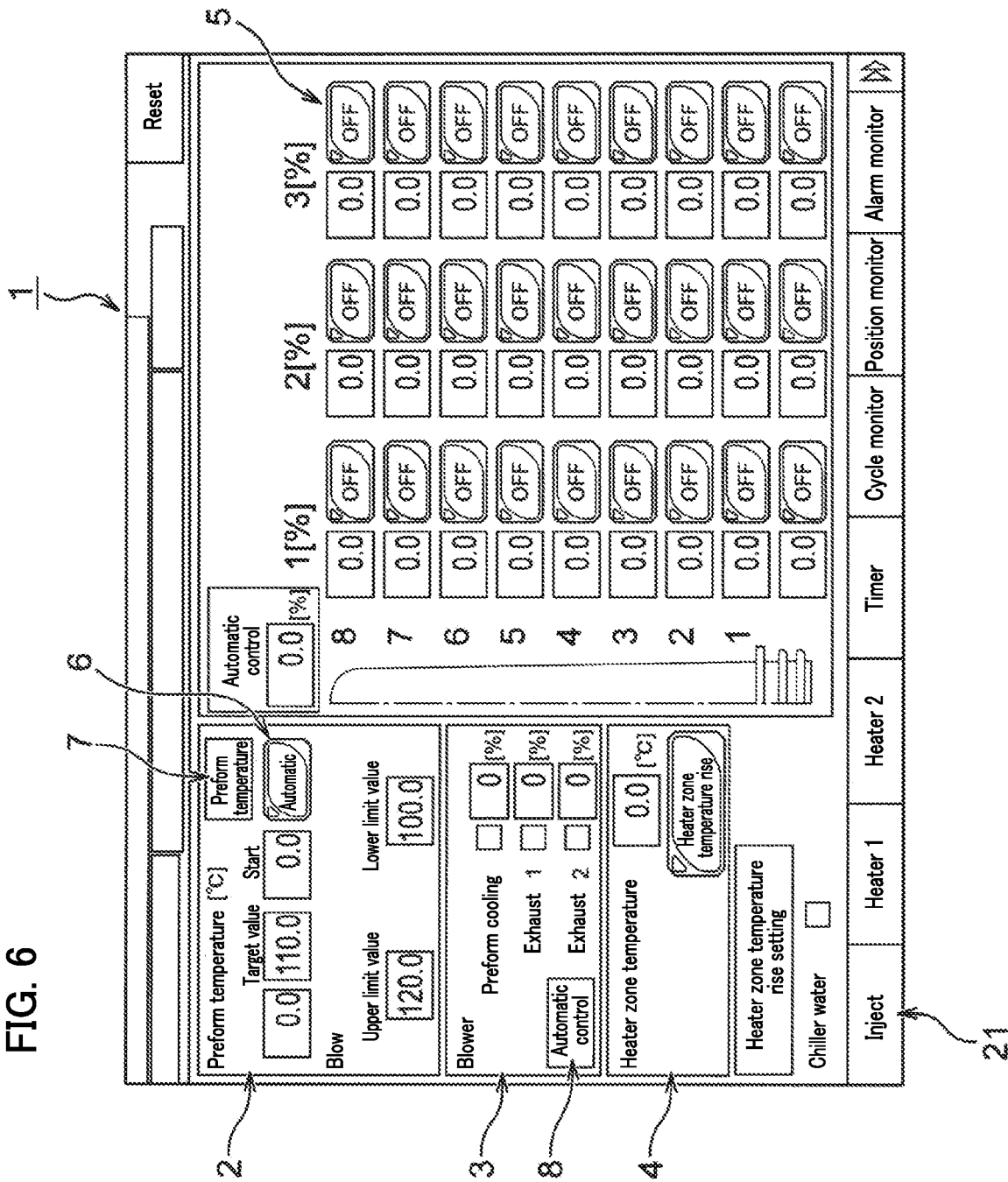
FIG. 6 is a diagram illustrating a control panel that controls an operation of the temperature adjustment device.

In the control panel (monitoring device) 1 illustrated in FIGS. 1 and 6, a reference numeral 2 denotes a preform temperature setting area, a reference numeral 3 denotes a blower operation display setting area, a reference numeral 4 denotes a heater zone temperature display area (the display area of a heating ambient temperature and the display area of an ambient temperature in the heating device 160 (heating box 161)), a reference numeral 5 denotes a heater output setting area for individually setting the output of the heater 166 according to each part of the preform, and the heater output setting area is used when an automatic heater output control button 6 (described later) of the preform temperature setting area 2 is turned off. A reference numeral 6 denotes an automatic heater output control button (heater output automatic control mechanism: the output automatic control mechanism of the heating device), and when the button is turned on, the output of the infrared heater 166 is automatically changed according to the voltage fluctuation of the supply power source. In addition, a reference numeral 7 denotes a preform temperature confirmation button, and when the button is pressed, the screen is switched to the screen of FIG. 7 (first preform temperature monitoring screen). In addition, the blower operation setting display area 3 in FIG. 6 includes individual output setting fields for the blowers 167 and 172, and a blower automatic control button (blower output automatic control mechanism: the output automatic control mechanism of the cooling device). When the blower automatic control button 8 is pressed, the screen is switched to the screen of FIG. 9 (automatic blower output setting screen). A reference numeral 21 denotes a molding condition selection button which switches an input screen of various setting values and a display screen of measured values in the injection molding unit 120, the heater 166, and the like. By selecting the "heater 2" button in the molding condition selection button 12, the heating device control screen of FIG. 6 is displayed on the control panel 1.

Figure 7:
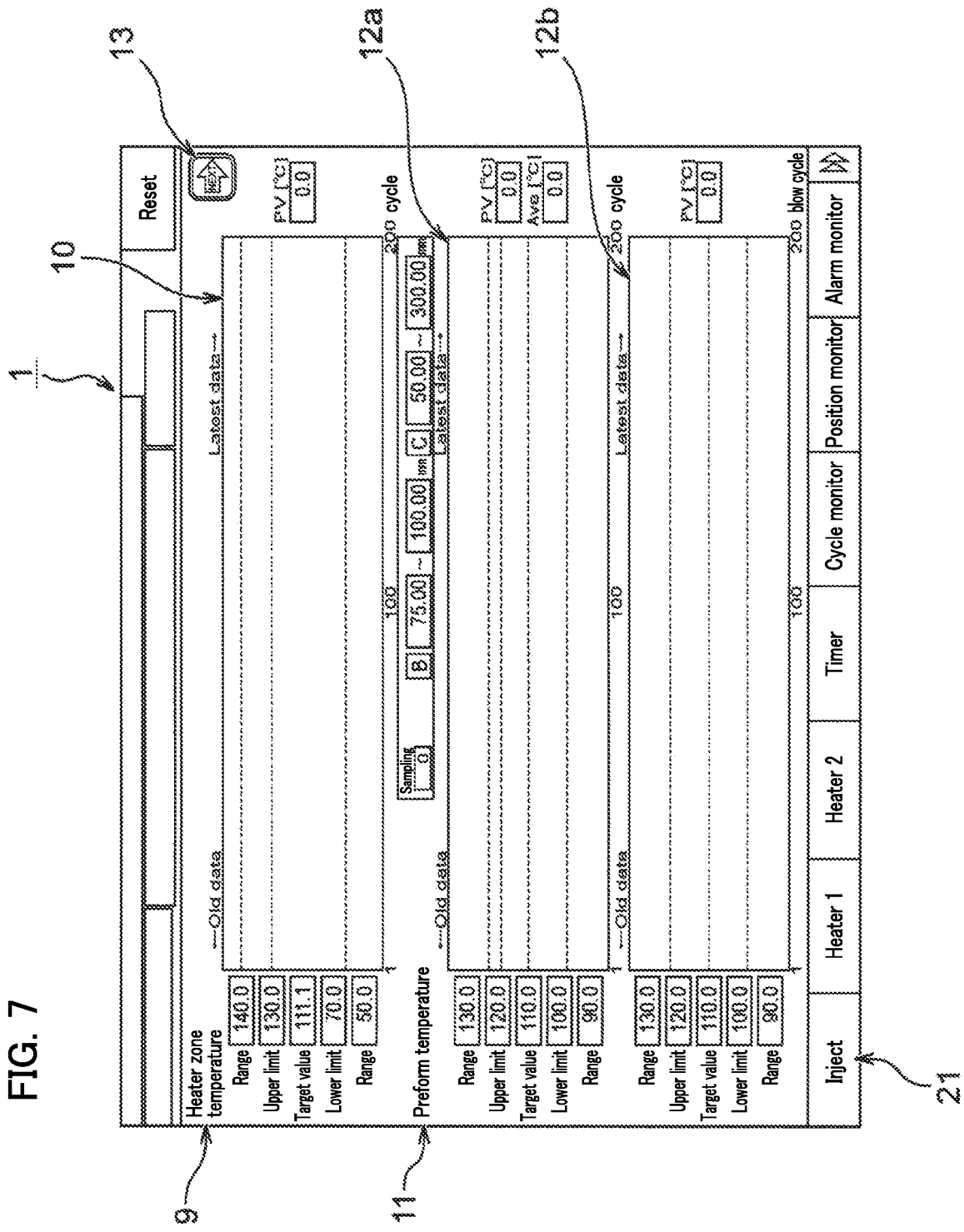
FIG. 7 is a diagram illustrating a first switching screen (first preform temperature monitoring screen) of the control panel in FIG. 6.

Next, FIG. 7 (first preform temperature monitoring screen) will be described. In FIG. 7, a reference numeral 9 denotes a heater zone temperature detail display area (the detailed display area of a heating atmosphere temperature, the detailed display area of an atmosphere temperature in the heating device 160 (heating box 161)), and in a temperature display portion 10, a change in the average ambient temperature (vertical axis) in the unit in the heating device 160 is shown according to a change in time (horizontal axis, more specifically one injection molding cycle unit) with the time taken for one injection molding (injection molding cycle) as one unit. The temperature (that is, the ambient temperature in the heating device 160) in the heater zone temperature detail display area 9 is measured by the temperature sensor 197 (see FIG. 1) which measures the temperature at a predetermined inner position of the heating device 160. In addition, a reference numeral 11 denotes a preform temperature display area, and the preform temperature display area includes a first temperature display portion 12a and a second temperature display portion 12b. In the first temperature display portion 12a, a change in the average temperature (vertical axis) of the preforms in the batch number 24 (eight×three rows) of preforms injected by the injection molding unit 120 is shown according to a change in time (horizontal axis, more specifically one injection molding cycle unit) with one injection molding (injection molding cycle) as one unit. In addition, in the second temperature display portion 12b, the average temperature (vertical axis) of the eight preforms blow-molded by the blow-molding unit 180 is shown according to a change in time (horizontal axis, more specifically one blow-molding cycle unit) with one blow-molding (blow-molding cycle) as one unit. The preform temperature is measured by the temperature sensor 198 (see FIG. 1, arranged immediately before the blow-molding unit 180) which measures the temperature of the preform during blow-molding. Therefore, in the screen of FIG. 7, when a defect occurs in the blow-molding, it is possible to grasp whether heating of the preform by the atmosphere of the heating device 160 is appropriate or abnormal. Incidentally, a reference numeral 13 denotes a button which switches the control panel 1 to the screen (second preform temperature monitoring screen) of FIG. 8.

Figure 8:
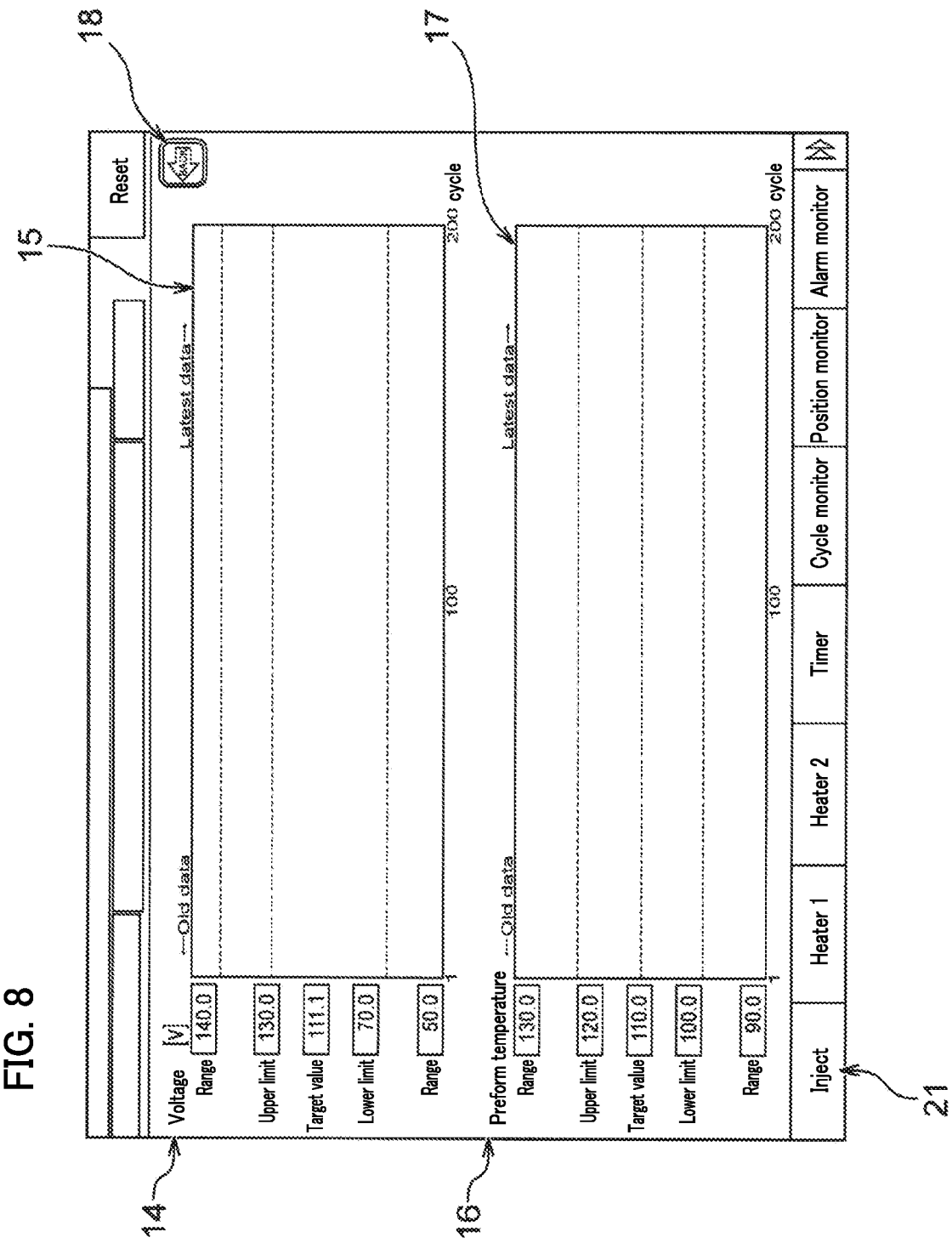
FIG. 8 is a diagram illustrating a second switching screen (second preform temperature monitoring screen) of the control panel in FIG. 6.

Next, FIG. 8 (second preform temperature monitoring screen) will be described. In FIG. 8, a reference numeral 14 denotes a voltage display area, and in a voltage fluctuation display portion 15, a change in voltage (vertical axis) during injection molding is shown according to a change in time (horizontal axis, more specifically one injection molding cycle unit) with one injection molding cycle as one unit. In addition, a reference numeral 16 denotes a preform temperature display area, and in a third temperature display portion 17, a change in the average temperature (vertical axis) of injection batch number 24 (eight×three rows) of preforms is shown according to a change in time (horizontal axis, more specifically one injection molding cycle unit) with one injection molding (injection molding cycle) as one unit. Therefore, in the screen of FIG. 8, the cause of the blow-molding defect can be estimated by comparing the voltage fluctuation with the temperature of the preform.

Figure 9:
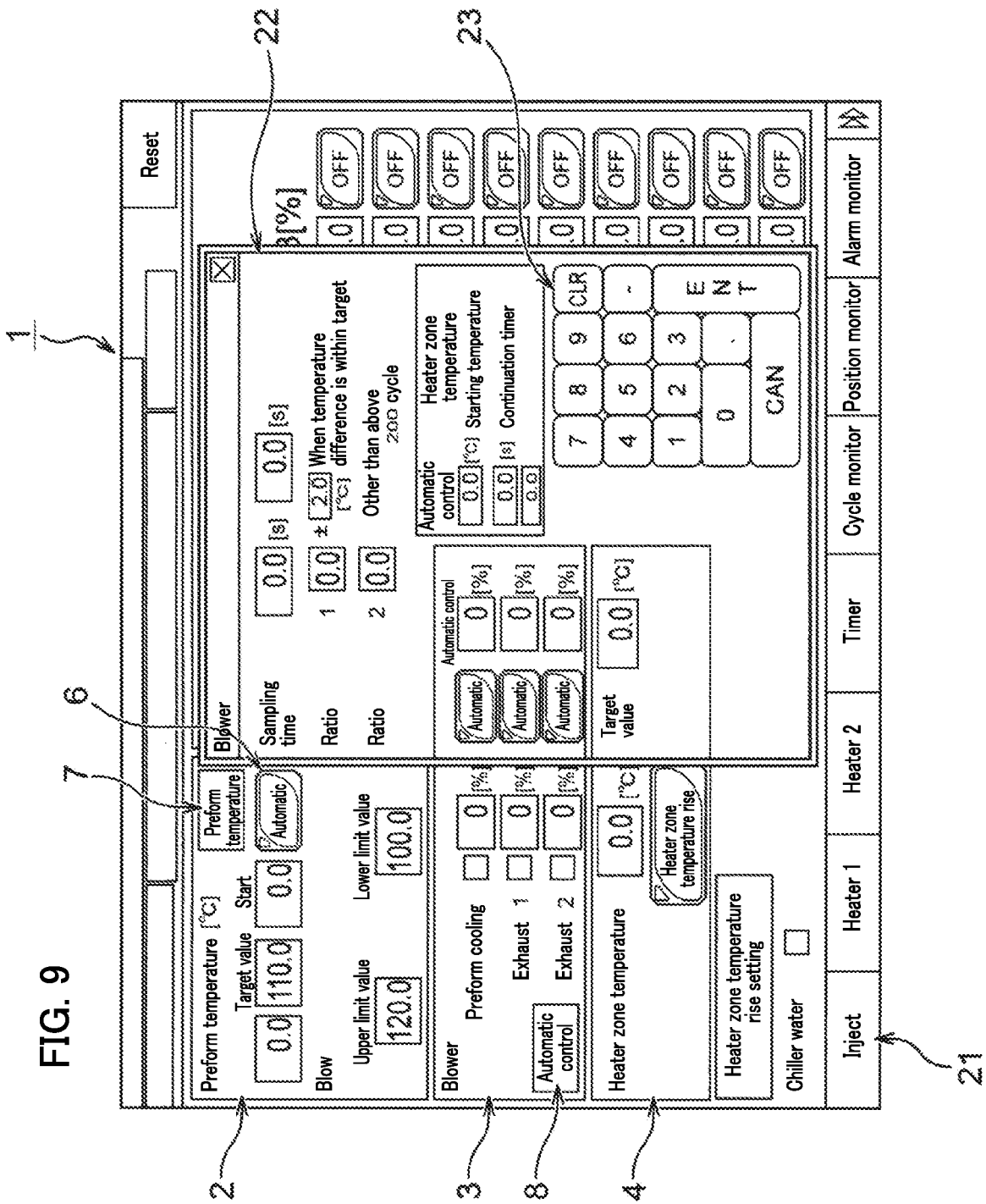
FIG. 9 is a diagram illustrating a third switching screen (automatic blower output setting screen) of the control panel in FIG. 6.

Next, the automatic blower output setting screen of FIG. 9 will be described. When the blower automatic control button 8 in the blower operation setting display area 3 of FIG. 6 is pressed, FIG. 9 is displayed in the right half area of FIG. 6. In FIG. 9, the left half has the same configuration as that of FIG. 6, a reference numeral 22 of the right half denotes the automatic control area of the blower, and various parameters can be changed by a touch panel button 23. In the automatic blower control display area 22, for example, a target value of the ambient temperature in the heating device 160 (heating box 161), a temperature difference from the target value at the start of the automatic operation of the blower (alternatively, the upper limit temperature or the lower limit temperature of the atmosphere when the automatic operation of the blower is started), a time interval for measuring the ambient temperature in the heating device 160 (heating box 161), and the like are set. Incidentally, since the blowers 167 and 172 monitor the ambient temperature and automatically control the outputs according to the setting conditions of FIG. 9, it is not necessary to input the individual output setting fields of the blowers 167 and 172.

Next, the operations in FIGS. 6 to 9 will be described.

First, in the preform temperature setting area 2 of the control panel 1 of FIG. 6, the temperature (target value) immediately before the blow-molding of the preform 200, the temperature (start value) of the preform 200 when the output of the heater 166 is automatically started, and the upper limit value and the lower limit value of the temperature of the preform 200 immediately before the blow-molding are set. Incidentally, the measured value is displayed on the left side of the target value.

As described above, when the supply voltage from the supply power source greatly fluctuates beyond a normal range (within a range of the upper limit value and the lower limit value of the supply voltage as indicated by 15 in FIG. 8) by the heater output automatic control mechanism, the automatic heater output control button 6 of FIG. 6 is pressed. Then, the heating output of the heater 166 automatically fluctuates (the heating output rises at low voltage, and the heating output drops at high voltage) according to the fluctuation of the supply voltage, and the preform 200 is heated so that the temperature falls within a normal range (that is, within a range of the upper limit value and the lower limit value of the heated preform temperature as indicated by 11 in FIG. 7 or 16 in FIG. 8). Therefore, even when voltage fluctuation occurs, the same heating amount (the power consumption amount of the heater 166) as in a case where there is no voltage fluctuation can be given to the preform 200, and the temperature distribution of a plurality of preforms 200 to be conveyed can be made uniform. Incidentally, the processing of the output fluctuation of the heater 166 at the time of voltage fluctuation (the processing of the heater output automatic control mechanism) is performed in a relatively short period of time (is performed within several injection molding cycles or immediately (for example, within 1 minute) in a case where the voltage fluctuation occurs).

In a case where the ambient temperature of the heating device 160 fluctuates beyond the normal range (that is, within a range between the upper limit value and the lower limit value of the heater zone temperature as indicated by 9 in FIG. 7), for example, when a long-term voltage fluctuation occurs due to the blower output automatic control mechanism, the blower automatic control button 8 of FIG. 6 is pressed. Then, the outputs of the blowers 167 and 172 automatically fluctuate, and the ambient temperature of the heating device 160 is adjusted to fall within the normal range. Accordingly, it is possible to maintain the ambient temperature of the heating device 160 substantially constant even in a case where voltage fluctuation occurs or is prolonged, thereby further uniformizing the heating condition of the preform 200. Incidentally, the processing (the operation of the blower output automatic control mechanism) of the output fluctuation of the blowers 167 and 172 in the long-term voltage fluctuation is performed for a relatively long period of time. That is, the processing is performed during a continuous molding cycle (for example, ten or more injection molding cycles) or continuous operation for several hours (for example, eight hours or more).

Incidentally, in the above-described embodiment, the heater 166 adjusts the preform temperature, and the blowers 167 and 172 adjust the ambient temperature. However, conversely, the heater 166 may adjust the ambient temperature, and the blowers 167 and 172 may adjust the preform temperature, or each of the heater 166 and the blowers 167 and 172 may adjust both the preform temperature and the ambient temperature.

Accordingly, there is no possibility that the preform 200 ruptures at the time of being blow-molded or water droplets are scattered and attached to the subsequent preform 200, and a favorable container can be obtained.

At this time, when the preform temperature confirmation button 7 in FIG. 6 is pressed, the panel 1 is switched to the screen of FIG. 7. Accordingly, the transition of the ambient temperature in the heating device 160 can be confirmed in graph display by the heater zone temperature display area 9, and the temperatures of the injection batch number 24 of preforms and the preform temperatures of the blow batch number 8 of preforms 200 can be monitored by the display portions 12a and 12b of the preform temperature display area 11 to grasp the suitability of heating of the preform 200 by the ambient temperature. Therefore, it is possible to continuously and in real time confirm the influence of the fluctuation in the ambient temperature in the heating device 160 due to the long-term voltage fluctuation on the heating condition (for example, insufficient heating) of the preform 200, and to estimate the factor of the blow-molding defect.

Next, when the switching button 13 in FIG. 7 is pressed, the panel 1 is switched to the screen of FIG. 8. Accordingly, the fluctuation of the voltage during injection molding can be displayed on the voltage fluctuation display portion 15 in the voltage display area 14, and the transition of the average temperature of the injection batch number 24 of preforms can be monitored on the temperature display portion 17 in the preform temperature display area 16. Accordingly, it is possible to grasp the appropriateness of heating of the preform by the heater 166 at the time of voltage fluctuation. Therefore, it is possible to continuously and in real time confirm the influence of the output fluctuation of the heater 166 due to the voltage fluctuation on the heating condition (for example, insufficient heating) of the preform, and to estimate the factor of the blow-molding defect. When a screen switching button 18 in FIG. 8 is pressed, the screen returns to the screen in FIG. 7.

Accordingly, in addition to the measures against the fluctuation of the predetermined voltage of the supply power source described above, the fluctuation of one or both of the preform temperature and the ambient temperature is constantly monitored in association with the product accuracy of the blow-molding of the preform, whereby the accuracy of the blow-molding of the preform can be further improved.

Although one embodiment of the present invention has been described above, the present invention is not limited to the above-described embodiment, and can be freely modified, improved, and the like as appropriate. In addition, the material, shape, dimension, numerical value, form, number, arrangement place, and the like of each component in the above-described embodiment are arbitrary and are not limited as long as the present invention can be achieved.

For example, the automatic heater output control button 6 (heater output automatic control mechanism) may be provided on the screen of FIG. 7 or 8, and the blower automatic control button 8 (blower output automatic control mechanism) may also be provided on the screen of FIG. 7 or 8.

The invention claimed is:
1. A blow-molding apparatus comprising:
a preform temperature adjustment apparatus which performs temperature adjustment by performing temperature processing on an injection-molded-preform by
a heating device configured to heat the preform to increase a preform temperature and
a cooling device configured to cool the preform to reduce the preform temperature, wherein
the preform subjected to the temperature adjustment is sent to a blow-molding device, wherein
the cooling device and the heating device are each driven by being supplied with electricity of a predetermined voltage from a supply power source, and
the blow-molding apparatus further comprising: a monitoring device configured to constantly monitor at least one of fluctuation in the predetermined voltage, the preform temperature, and an ambient temperature; and an output automatic control mechanism configured to, in a case where the predetermined voltage monitored by the monitoring device fluctuates beyond a normal range or a case where an abnormality occurs in blow-molding of the preform due to fluctuation in at least one value of the preform temperature and the ambient temperature, automatically fluctuate an output of at least one of the cooling device and the heating device to keep the output in a certain range, thereby adjusting at least one of the preform temperature and the ambient temperature to fall within a normal temperature range, and wherein, the monitoring device controls the display of at least one of a first screen or a second screen on a display device, wherein, in the first screen, a graph is displayed indicating a correspondence between a change in ambient temperature caused by the heating device in an injection molding cycle, a change in temperature of preforms in a number of injection batches in the injection molding cycle, and a change in temperature of preforms to be blow molded in blow molding cycle, wherein, in the second screen, a graph is displayed indicating a correspondence between a voltage change in the injection molding cycle and the change in temperature of preforms in the number of injection batches in the injection molding cycle.

2. The blow-molding apparatus according to claim 1, wherein
the preform temperature adjusted by the preform temperature adjustment apparatus is a temperature of the preform immediately before blow-molding, and the ambient temperature is an inner temperature of the heating device.

3. The blow-molding apparatus according to claim 1, wherein
the output automatic control mechanism changes the outputs of both the heating device and the cooling device simultaneously.

4. The blow-molding apparatus according to claim 1, wherein
the cooling device is a blower which controls the preform temperature over a relatively long period of time.

5. The blow-molding apparatus according to claim 1, wherein
the heating device is an infrared heater which controls the preform temperature over a relatively short period of time.

* * * * *